(12) United States Patent
Shin (10) Patent No.: US 8,265,850 B2
(45) Date of Patent: Sep. 11, 2012

(54) METHOD AND APPARATUS FOR TARGET VEHICLE FOLLOWING CONTROL FOR ADAPTIVE CRUISE CONTROL

(75) Inventor: Kwang-Keun Shin, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 12/689,580

(22) Filed: Jan. 19, 2010

(65) Prior Publication Data
US 2010/0198478 A1 Aug. 5, 2010

Related U.S. Application Data

(60) Provisional application No. 61/149,045, filed on Feb. 2, 2009.

(51) Int. Cl.
*B60T 8/32* (2006.01)

(52) U.S. Cl. ............................. 701/93; 701/96

(58) Field of Classification Search ............... 701/93, 701/96
See application file for complete search history.

(56) References Cited

U.S. PATENT DOCUMENTS

| | | | |
|---|---|---|---|
| 6,233,515 B1 * | 5/2001 | Engelman et al. | 701/96 |
| 6,266,580 B1 * | 7/2001 | Asahara et al. | 700/282 |
| 6,876,915 B2 * | 4/2005 | Kuramochi et al. | 701/96 |
| 7,124,027 B1 * | 10/2006 | Ernst et al. | 701/301 |
| 7,739,023 B2 * | 6/2010 | Lee | 701/96 |
| 7,966,118 B2 * | 6/2011 | Kade | 701/96 |
| 8,055,427 B2 * | 11/2011 | Shin | 701/93 |
| 2005/0149247 A1 * | 7/2005 | Kuramochi et al. | 701/96 |
| 2008/0300787 A1 * | 12/2008 | Zeng | 701/301 |
| 2009/0157276 A1 * | 6/2009 | Kade | 701/96 |
| 2010/0198450 A1 * | 8/2010 | Shin | 701/29 |

* cited by examiner

*Primary Examiner* — Mary Cheung
*Assistant Examiner* — Truc M Do (57) ABSTRACT

A host vehicle's speed is controlled with a target vehicle following control system when following a target vehicle. The target vehicle following control system monitors a range with respect to a target vehicle and a speed of the host vehicle. The target vehicle following device determines operation of the vehicle based upon a control region by comparing the range and the speed of the host vehicle to a simple sliding surface, which defines a minimum range between the host vehicle and target vehicle and a modified sliding surface, which increases the margin to the simple sliding surface as the speed of the host vehicle increases. The host vehicle has an acceleration determined based on the control region and is used to control operation of the host vehicle.

19 Claims, 9 Drawing Sheets

METHOD AND APPARATUS FOR TARGET VEHICLE FOLLOWING CONTROL FOR ADAPTIVE CRUISE CONTROL

CROSS REFERENCE TO RELATED APPLICATIONS

This application claims the benefit of U.S. Provisional Application No. 61/149,045 filed on Feb. 2, 2009 which is hereby incorporated herein by reference.

TECHNICAL FIELD

This disclosure is related to automatic speed control in a motor vehicle.

BACKGROUND

The statements in this section merely provide background information related to the present disclosure and may not constitute prior art.

Adaptive Cruise Control (ACC) is a control method for automatically controlling a vehicle within a lane of traffic, maintaining a desired speed while maintaining a safe distance from other vehicles in the same lane of travel. The essential function of ACC is target vehicle following which means that a host vehicle follows a target vehicle while maintaining a predetermined separation (e.g. time or distance). The host vehicle is the vehicle being controlled by ACC, and the target vehicle is the vehicle in front of the host vehicle.

The host vehicle includes a device or devices capable of sensing presence, range (r), and a change in range or range rate (r_dot) between the host vehicle and a target vehicle in the same lane of travel. A number of devices or combinations of devices are capable of generating this information, e.g., radar, LIDAR, sonar, visual, and vehicle location devices. The inputs to control a system within the host vehicle include r, r_dot, and host vehicle speed (v). Target vehicle following occurs when the control module processes inputs, according to programming applying a desired range formula, and outputs acceleration commands to brake/throttle control modules according to the sign (i.e. positive acceleration command is sent to throttle control module and negative acceleration (i.e. deceleration) is sent to brake control module). The brake and throttle control modules translate the deceleration and acceleration commands into brake and throttle effort and applies brake and throttle accordingly.

SUMMARY

A method for controlling vehicle speed in a host vehicle operating with a target vehicle following control system in relation to a target vehicle includes monitoring a range between the host vehicle and the target vehicle, monitoring a speed of the host vehicle, and determining a control region of the host vehicle. The control region of the host vehicle is determined by comparing the range between the host vehicle and the target vehicle and the speed of the host vehicle to a simple sliding surface defining a minimum range between the host vehicle and the target vehicle based upon a time headway, and comparing the range between the host vehicle and the target vehicle and the speed of the host vehicle to a modified sliding surface defined by an increasing margin to the simple sliding surface as the speed of the host vehicle increases. An acceleration command based upon the determined control region is determined and utilized to control operation of the vehicle.

BRIEF DESCRIPTION OF THE DRAWINGS

One or more embodiments will now be described, by way of example, with reference to the accompanying drawings, in which:

FIG. 7 is a series of graphs depicting an exemplary vehicle chase scenario with a host vehicle following a target vehicle wherein FIG. 7A graphically illustrates speed verses time, FIG. 7B graphically illustrates range versus time, FIG. 7C graphically illustrates acceleration verses time, and FIG. 7D graphically illustrates host speed verses time;

FIG. 8 is a series of graphs depicting a sudden stop exemplary scenario wherein FIG. 8A graphically illustrates speed verses time, FIG. 8B graphically illustrates range versus time, FIG. 8C graphically illustrates acceleration verses time, and FIG. 8D graphically illustrates host speed verses range for a target vehicle chase scenario;

FIG. 10 is a series of graphs depicting a mild lane cut-in exemplary scenario wherein FIG. 10A graphically illustrates speed verses time, FIG. 10B graphically illustrates range versus time, FIG. 10C graphically illustrates acceleration verses time, and FIG. 10D graphically illustrates host speed verses range;

FIG. 11 is a series of graphs depicting a moderate lane cut-in exemplary scenario wherein FIG. 11A graphically illustrates speed verses time, FIG. 11B graphically illustrates range versus time, FIG. 11C graphically illustrates acceleration verses time, and FIG. 11D graphically illustrates host speed verses range; and FIG. 12 is a series of graphs depicting an aggressive cut-in exemplary scenario wherein FIG. 12A graphically illustrates speed verses time, FIG. 12B graphically illustrates range versus time, FIG. 12C graphically illustrates acceleration verses time, and FIG. 12D graphically illustrates host speed verses range.

DETAILED DESCRIPTION

Figure 1:
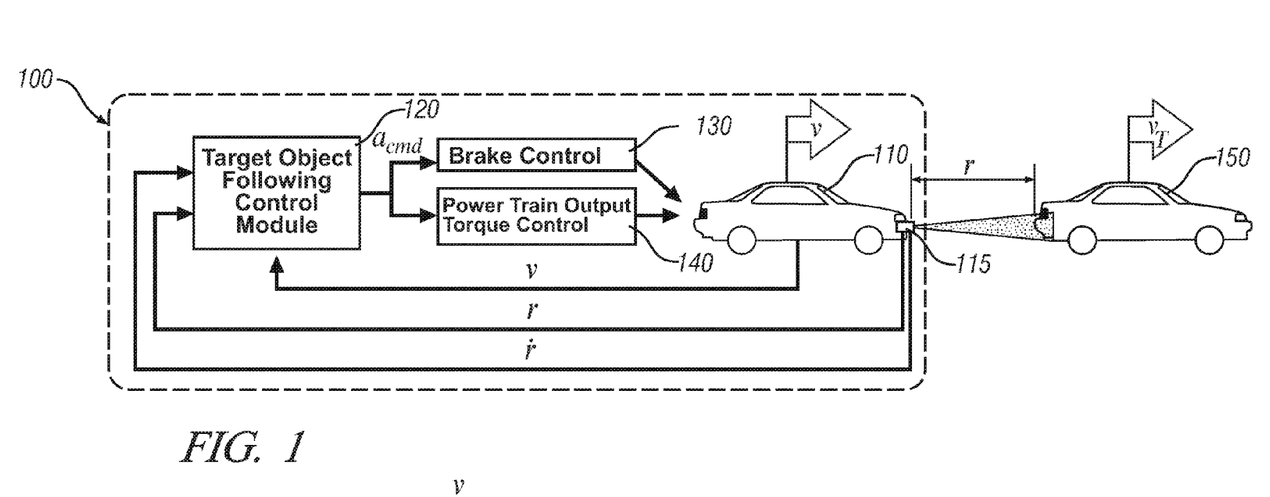
FIG. 1 depicts an exemplary target vehicle following control system, in accordance with the present disclosure.

Referring now to the drawings, wherein the showings are for the purpose of illustrating certain exemplary embodiments only and not for the purpose of limiting the same, FIG. 1 depicts an exemplary target vehicle following control system 100, in accordance with the present disclosure. Target vehicle following control system 100, which may also be referred to as adaptive cruise control (ACC), includes host vehicle 110, sensing device 115, target object following control module 120, brake control module 130, and powertrain output torque control module 140. As used herein, the terms control, controller, module, control module and the like are understood to mean various ones or combinations of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event. A target vehicle 150 is also depicted. The various modules are pictured separately from host vehicle 110 for purposes of describing the effect of the various modules upon host vehicle speed v; however, it will be appreciated that these modules are either physically situated within host vehicle 110 or are available to host vehicle 110 such as over a communications network. Host vehicle 110 is traveling at speed or velocity v, and sensors (e.g. a vehicle speed sensor) internal to host vehicle 110 generate a signal describing v. Target vehicle 150 is traveling at speed or velocity $v_T$. Sensing device 115 integral to host vehicle 110 gathers data regarding r and r_dot in relation to target vehicle 110. The target object following control module 120 monitors inputs of v, r, and r_dot. Applying methods described herein, module 120 outputs an acceleration command ($a_{cmd}$) describing a desired change in v. The magnitude and sign of $a_{cmd}$ corresponds to a desired increase or decrease in v, brake control module 130 issues a braking command from module 130, activating brakes to apply a slowing force upon wheels of the vehicle; powertrain output torque control module 140 issues an accelerator command from module 140, changing the torsional force applied through the drivetrain to the wheels; or both. It will be appreciated that different exemplary embodiments of the above described vehicle systems can be utilized, for example, with a hybrid powertrain vehicle utilizing regenerative braking instead of typical braking mechanisms or a transmission and engine being utilized to implement gear braking. The effects of the commands from modules 130 and 140 effect the operation of host vehicle 110 and resulting v. In this way, target vehicle following control system 100 controls v in a closed feedback loop based upon v, r, and r_dot.

Powertrain output torque control module 140 controls various components of the powertrain to affect output torque applied to the wheels of the vehicle. In this way, speed v can be controlled within certain limits, depending upon the particulars of the powertrain employed. In a powertrain including an internal combustion engine changes to output torque can be affected by a simple change in throttle setting. Desired increases in speed v can be achieved by demanding a greater powertrain output torque. One having ordinary skill in the art will appreciate that such changes in throttle setting take a relatively longer time T to enact than other changes to output torque from an engine 10. For example, ignition timing or fuel injection timing can be altered to more quickly temporarily reduce output torque. In a powertrain including torque generation devices, e.g., electric motor(s) or hydraulic torque generator(s), in a hybrid drive powertrain, output torque can be cut by reducing the torque contribution of a torque generation device(s). In such a powertrain, it will be appreciated that, a torque generator device can be operated in a generator mode, applying an output torque in the reverse or braking direction and thereby allowing reclamation of energy to an energy storage device. The embodiments described illustrate a number of examples by which output torque changes can be commanded. Many methods for changing output torque are known in the art, and the disclosure is not intended to be limited to the particular embodiments described herein.

Sensing device 115 provides a data stream of information including at least range, r, and a change in range or a range rate, r_dot. Sensing device 115 can represent a single sensor, a single sensor combined with a processor, a multitude of sensors, or any other known configuration capable of generating the required data stream. One preferred embodiment includes known radar devices 115, but may also include vision, LIDAR, or sonar devices. The sensing device 115 attached to the host vehicle 110 detects r (the distance between the two vehicles), and r_dot (relative speed of the target vehicle 150 with respect to the host vehicle 110) for use by the target vehicle following control system 100.

As described above, target object following control module 120 inputs data regarding the conditions in the lane in front of the host vehicle 110, monitoring at least r, r_dot, and v. Target object following control module 120 output $a_{cmd}$ is to control the host vehicle 110 into a desired range of operation with respect to the target vehicle 150 and based on input parameters r, r_dot, and v. Target object following control module 120 can include a program or a number of programs to utilize the inputs, applying calibrated relationships and desired values to achieve the necessary balance of the host vehicle 110 either to static lane conditions or dynamic lane conditions. Exemplary embodiments of this programming are described herein, however it will be appreciated that the overall methods described herein can be achieved through a number of different programming embodiments seeking to achieve the enabled balance between safety considerations, drivability, and other concerns necessary to ACC in a moving host vehicle 110. Programming techniques and methods for data manipulation are well known in the art, and this disclosure is not intended to be limited to the particular exemplary programming embodiments described herein.

As described above, ACC is a method whereby a host vehicle speed v is controlled according to a reference speed $v_r$, as in common cruise control, and additionally, speed control is performed based upon maintaining a particular range r from a target vehicle 150 in front of the host vehicle 110. Selecting a reference speed $v_r$ based upon a target vehicle 150 position and relative speed r_dot to the host vehicle 110 is based upon a desired range r. Selection of the desired range r that the host vehicle 110 is controlled to can be achieved through a calibration process, wherein range r between vehicles is set based upon values balancing a number of preferences, including but not limited to balancing reasonable distances to operator preferences. Control according to the desired range r values can take many forms. One embodiment includes utilizing a sliding mode control, a control technique that brings the state of the system into a desired trajectory, transitioning range r to a desired value, called a simple sliding surface 155, and defines the desired speed profile as described in further detail below. In ACC applications, this state is range r of the target vehicle 150 and speed v of the host vehicle 110 and the range-speed state follow the desired trajectory. The sliding mode control makes it possible for the ACC system to keep its range-speed state on the simple sliding surface 155.

An exemplary method for operating a target vehicle following control system 100 is disclosed. Control programming first calculates the speed of the target vehicle $v_T$ from the sensor signals by the following equation.

$$v_T = v + \dot{r} \quad [1]$$

The control algorithm then determines reference host vehicle speed $v_r(r, v_T)$ which is function of range r and the target vehicle speed $v_T$.

The control objective of the target vehicle following control system 100 is to keep the host vehicle speed v same as the reference speed $v_r(r, v_T)$. A speed error e can be defined between the reference speed $v_r(r, v_T)$ and the host vehicle speed v by using the following equation.

$$\epsilon: e = v_r(r, v_T) - v \quad [2]$$

The control objective can be achieved by using sliding mode control when setting the simple sliding surface 155 to e.

The longitudinal dynamics of the host vehicle 110 need to be accounted for to derive the sliding mode control. When acceleration command $a_{cmd}$ is applied, the longitudinal equation of motion of the vehicle can be expressed by the following equation.

$$\dot{v} = a_{cmd} - d \quad [3]$$

The value of d is assumed to be unknown but is a constant disturbance representing road grade and air-drag. A Lyapunov function can be expressed by the following equation.

$$V = \frac{1}{2}\gamma_I e^2 + \frac{1}{2}(q-d)^2 \quad [4]$$

The term $\gamma_I > 0$ is integral control gain, and q is the integration of the speed error, i.e., $\dot{q} = \gamma_I e$. The time derivative of the Lyapunov function expressed in Equation 4 can be expressed as the following equation.

$$\dot{V} = \gamma_I e \dot{e} + (q-d)\dot{q} = \gamma_I e(\dot{e} + q - d) \quad [5]$$

The time derivative of Equation 2 can be expressed by the following equation.

$$\dot{e} = \frac{d}{dt} v_r(r, v_T) - \dot{v} \quad [6]$$

By substituting Equation 3 into Equation 6, the equation is expressed as follows.

$$\dot{e} = \frac{d}{dt} v_r(r, v_T) - a_{cmd} + d \quad [7]$$

Therefore, Equation 5 can be expressed as the following equation:

$$\dot{V} = \gamma_I e \left\{ \frac{d}{dt} v_r(r, v_T) - a_{cmd} + q \right\} \quad [8]$$

where $\dot{q} = \gamma_I e$.

If we choose the following control law:

$$a_{cmd} = a_r + \gamma_p e + q \quad [9]$$

where $a_r = \frac{d}{dt} v_r(r, v_T)$, $\dot{q} = \gamma_I e$, and $\gamma_P > 0$, then Equation 8 can be expressed by the following equation.

$$\dot{V} = -\gamma_I \gamma_P e^2 < 0, \forall e \neq 0, (d-q) \neq 0 \quad [10]$$

Therefore, Equation 9, the control law, guarantees that the speed error e to the simple sliding surface 155 converges to zero as time T goes to infinity. The system state is now on the simple sliding surface 155, therefore, the trajectory becomes a stable invariant set, and the system state remains on the simple sliding surface 155.

With regard to selection of $v_r$, a speed profile $v_r(r, v_T)$ that satisfies the following two conditions qualifies for the reference host vehicle speed profile.

$$v_T = v_r(r_T, v_T) \quad [11]$$

$$(r - r_T)((v_r - v_T) > 0 \quad \forall r \neq r_T \quad [12]$$

Equation 11 states that the simple sliding surface 155 should pass through the equilibrium point $r_T, v_T$), and Equation 12 is the sufficient condition for the stability of the system on the simple sliding surface 155 as discussed below. Assuming the range-speed state is already on the simple sliding surface 155 and the control programming keeps the state on the simple sliding surface 155, the equation can be expressed as follows.

$$v = v_r(r, v_T) \quad [13]$$

To study the stability of the system on the simple sliding surface 155, the range error can be defined by the following equation.

$$\tilde{r} = r - r_T \quad [14]$$

Since the speed v on the curve is dependent variable of the range r, the system on the curve has only one state. If a positive definite Lyapunov function is defined with respect to the range error $\tilde{r}$, such as:

$$V = \frac{1}{2}(r - r_T)^2 \quad [15]$$

then the time derivative of Equation 9 can be expressed by the following equation.

$$\frac{d}{dt}V = (r - r_T)\dot{r} = -(r - r_T)\{v_r(r, v_T) - v_T\} \quad [16]$$

If the speed profile $v_r(r, v_T)$ satisfies Equations 11 and 12, the time derivative expressed in Equation 16 of the Lyapynov function is negative definite with respect to the range error $\tilde{r}$, and hence the system is asymptotically stable.

Figure 2:
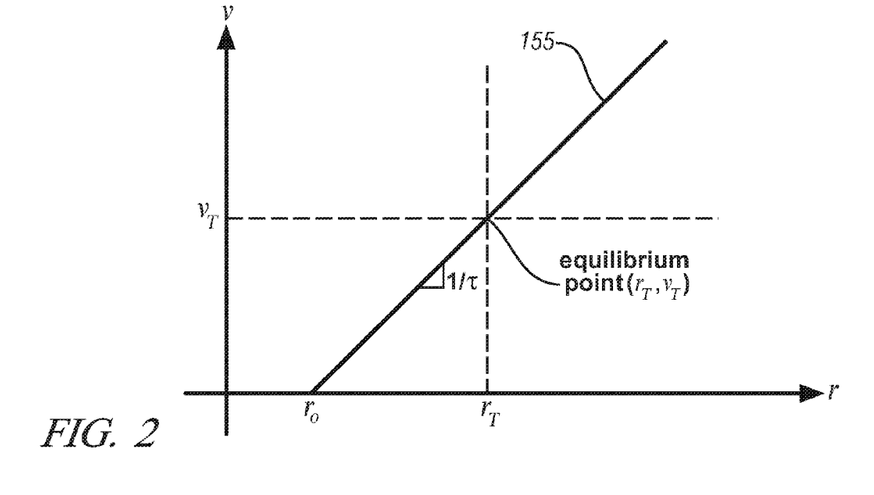
FIG. 2 graphically depicts an exemplary speed profile, in accordance with the present disclosure.

FIG. 2 graphically depicts an exemplary reference simple sliding surface 155, in accordance with the present disclosure. Such a sliding surface can be used to describe the reactions of a host vehicle to the presence of a target vehicle, for example, as a target vehicle is detected maneuvering into the lane of the host vehicle. A simple sliding surface 155 can be defined for the $v_r$, describing a minimum r that is desired to be maintained for a given $v_r$. One preferred method of defining an operating range is using time headway $\tau$. The time headway $\tau$ is a construct defined as the time T for the host vehicle 110 to travel the distance, or range r, between the host vehicle 110 and the target vehicle 150 at the current speed v of the host vehicle. Time headway $\tau$ can be developed experimentally, empirically, predictively, through modeling, or other techniques adequate to accurately describe vehicle behavior upon the road. A number of time headway $\tau$ values or other methods to select values can be established based upon factors affecting stopping distance of the vehicle, ability to accurately sense the target vehicle, and other factors affecting operation of the methods described herein. One simple sliding surface 155, is shown in FIG. 2. The simple sliding surface 155 line, can be expressed by the following equation.

$$v_r = v_T + (r - r_T)/\tau \quad [17]$$

If the speed-range state is on the simple sliding surface 155, the state stays on the simple sliding surface 155 while maintaining the time headway $\tau$. However the acceleration and deceleration on the simple sliding surface 155 can be very fast as speed gets higher, as expressed by the following equation.

$$a_r = \frac{\partial v_d}{\partial r} \dot{r} = -\frac{(v_d - v_T)}{\tau} \quad [18]$$

This fast acceleration and deceleration is acceptable in critical situations such as sudden cut-in with short range. However, if the range r becomes longer, smoother operation with limited acceleration and deceleration can occur. Comparing the speed of the host vehicle and the range of the host vehicle to the target vehicle to the simple sliding surface can describe a condition in which the velocity of the vehicle must be increased according to the simple sliding surface and a condition in which the velocity of the vehicle must be decreased according to the simple sliding surface.

The simple sliding surface 155 may also be utilized to describe how a host vehicle 110 reacts while not on the simple sliding surface 155. For example, for a measured $v_T$ value, the control system determines whether the existing r value is in the region above or in the region below the simple sliding surface 155. If the existing r value is in the region above the surface, a negative $a_{cmd}$ is generated to decrease output torque commanded of the powertrain, activate braking force, or both in order to increase r to a desired range value, $r_T$. If the existing r value is in the region below the surface, a positive $a_{cmd}$ is generated to increase output torque commanded of the powertrain in order to decrease r to the desired value, $r_T$ or until a predetermined speed is reached.

As mentioned above, drivability of a host vehicle 110 operated by ACC is an important characteristic in selecting parameters within a target object following control module 120. Drivability is adversely affected by quick or frequent changes in acceleration, high jerk, or other dynamic factors that detract from smooth operation of the host vehicle 110. For smooth operation, acceleration and deceleration needs to be limited to a certain level. An equation can be expressed to describe the simple sliding surface 155 with its acceleration and deceleration limited by $\beta_o$, an absolute value of a set acceleration/deceleration limit selected to ensure smooth braking, to create a modified sliding surface by the following equations.

$$v_r = v_T + \sqrt{2\beta_o(r - r_T) - \beta_o^2 \tau^2} \quad [19]$$

$$a_r = \frac{dv_r}{dt} = -\beta_o \quad [20]$$

Figure 3:
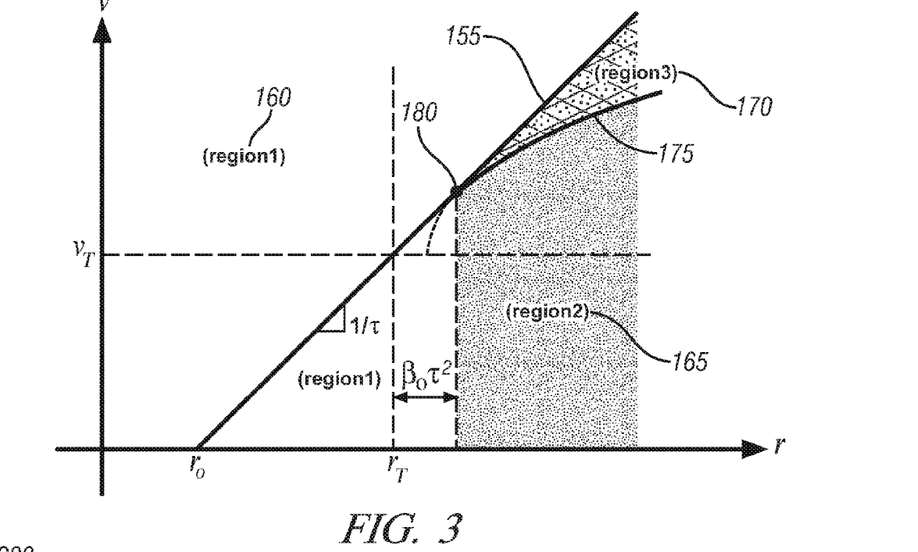
FIG. 3 graphically illustrates an exemplary speed profile and an exemplary smooth operational speed profile, in accordance with the present disclosure.

FIG. 3 graphically illustrates an exemplary simple sliding surface 155 and an exemplary modified sliding surface 175, in accordance with the present disclosure. Simple sliding surface 155, as described above, defines a desired minimum range between the host vehicle and the target vehicle based upon the time headway $\tau$. The modified sliding surface 175 is a surface adjacent to the simple sliding surface and is defined by the simple sliding surface and an increasing margin to the simple sliding surface as the speed of the host vehicle increases. The simple sliding surface 155 and the modified sliding surface 175 are coincident at and below a point, called threshold speed 180, and diverge above. The location of the threshold speed 180 and the dependent operation of the modified sliding surface 175 are dependent upon the location of $r_T$. The operation of the vehicle with respect to the modified sliding surface 175 is described hereinbelow. In the exemplary embodiment of FIG. 3, the threshold speed 180 is selected based upon a location upon simple sliding surface 155 corresponding to a range $\beta_0 \tau^2$ above $r_T$. However, it will be appreciated that the threshold speed 180 can be located based upon $r_T$ or $v_T$ according to a number of methods. Alternatively, the threshold speed can be coincident to $v_T$, with the modified sliding surface operative entirely to $v_T$. Additionally, the threshold speed 180 may be adjustable based on operator input or operating conditions, e.g., weather conditions, rough road detection, or inputs from other systems. A threshold range can be defined based upon the threshold speed and simple sliding scale. The simple sliding surface 155 and modified sliding surface 175 define host vehicle 110 operation into three control regions which define how v is to be controlled. Region 1, 160, includes two subregions, the first existing above the simple sliding surface 155 and the second existing below the simple sliding surface 155 and with r less than the threshold range. Region 1 describes a region in which v is controlled directly to the simple sliding surface 155. Region 2, 165, exists below the simple sliding surface 155 and the modified sliding surface 175 and with r greater than threshold range and describes a region in which v is controlled to the modified sliding surface 175 before being controlled to the simple sliding surface 155. Region 3, 170, exists between the simple sliding surface 155 and the modified sliding surface 175 and describes a region in which v is controlled between or according to one of the sliding surfaces. The three regions, 160, 165, 170 define vehicle control specific to a particular region. The three regions 160, 165, 170, may use operating considerations, e.g., characteristics affecting safety, drivability, and other operating concerns, to achieve predetermined host vehicle 110 operation. In this way, three regions can be defined by a region between the sliding surfaces 155, 175 and regions to either side of the sliding surfaces 155, 175. Comparison of v and r to the simple sliding surface and the modified sliding surface according to the defined regions can describe operation of the vehicle to fit one of the following regions: wherein r is less than the threshold range (region 1); wherein v is greater than a desired velocity for r based upon the simple sliding surface 155 (region 1); wherein r is greater than the threshold range and wherein v is less than a desired velocity for r based upon the modified sliding surface 175 (region 2); and wherein operation of the vehicle is between the simple sliding surface 155 and the modified sliding surface 175 (region 3).

Operation of the vehicle with respect to the sliding surfaces 155 and 175 are described in greater detail. As described above, v not coincident with simple sliding surface 155 will cause acceleration or deceleration of the vehicle such that v will converge to the simple sliding surface 155. Such operation is evident in region 1, wherein v is changed until operation is coincident with the sliding surface 155. Once v is upon sliding surface 155, the vehicle will operate upon that surface until $v_T$ is reached. In this way, the simple sliding surface 155 defines host vehicle 110 stopping without collision in the event the target vehicle 150 stops.

Operation in region 2 similarly guides the vehicle toward operation at $v_T$. Operation with v not coincident with the sliding surface, to the right of the depicted modified sliding surface 175 of FIG. 3, will converge to the modified sliding surface 175 and thereafter remain coincident therewith. Once v is coincident with the modified sliding surface 175, the vehicle will operate upon the modified sliding surface 175, reducing v until the simple sliding surface 155 is reached and v can subsequently be controlled to $v_T$. In this way, the pictured modified sliding surface 175 adds a buffer, or a margin of safety, at higher speeds v above the threshold speed 180 thereby increasing the corresponding range r to the target vehicle 150 through the transition to $v_T$. It will be appreciated that operation according to the described transition from region 2 to $v_T$ by modified sliding surface 175 controls the host vehicle with reduced acceleration commands for smoother vehicle operation and improved drivability as opposed to control according to simple sliding surface 155 alone.

Operation in region 3 is similar to operation upon one of the sliding surfaces 155 and 175. The vehicle remains in region 3 or upon one of the adjoining sliding surfaces 155 and 175 until v is reduced to the threshold speed 180 and subsequently controlled upon the simple sliding surface 155 to $v_T$. Control of v within region 3 can be according to methods described herein or according to methods to reduce the speed of a vehicle known in the art.

It will be noted that the form of both the simple and the modified sliding surfaces in FIG. 3 are exemplary, and either sliding surface can take alternative form. For instance, the simple sliding surface can be curved to include longer headway at higher speeds. Exemplary modified sliding surface 175 depicted in FIG. 3 is a segment of a parabola, with the range gap between surfaces 155 and 175 growing non-linearly as v increases. In another embodiment, the simple sliding surface can be straight for some portion at lower speeds and curved for another portion at higher speeds. The modified sliding surface can be a straight line with a different slope than the simple surface, diverging from the simple sliding surface at higher speeds. In yet another embodiment, the simple sliding surface, the modified sliding surface, or both may be operator adjustable. Additionally, one or both of the sliding surfaces and the relationships between the sliding surfaces can change depending upon factors affecting vehicle operation. Exemplary factors include weather capable of creating slippery roads, inputs from anti-lock brakes showing vehicle behavior indicating worn brakes or gross vehicle overload, driving patterns or habits observed of the driver indicating a preference for greater or lesser headway, and driver selectable preferred headway. The above described embodiments of the sliding surfaces are exemplary, and the disclosure is not intended to be limited to the particular exemplary embodiments described herein.

Figure 4:
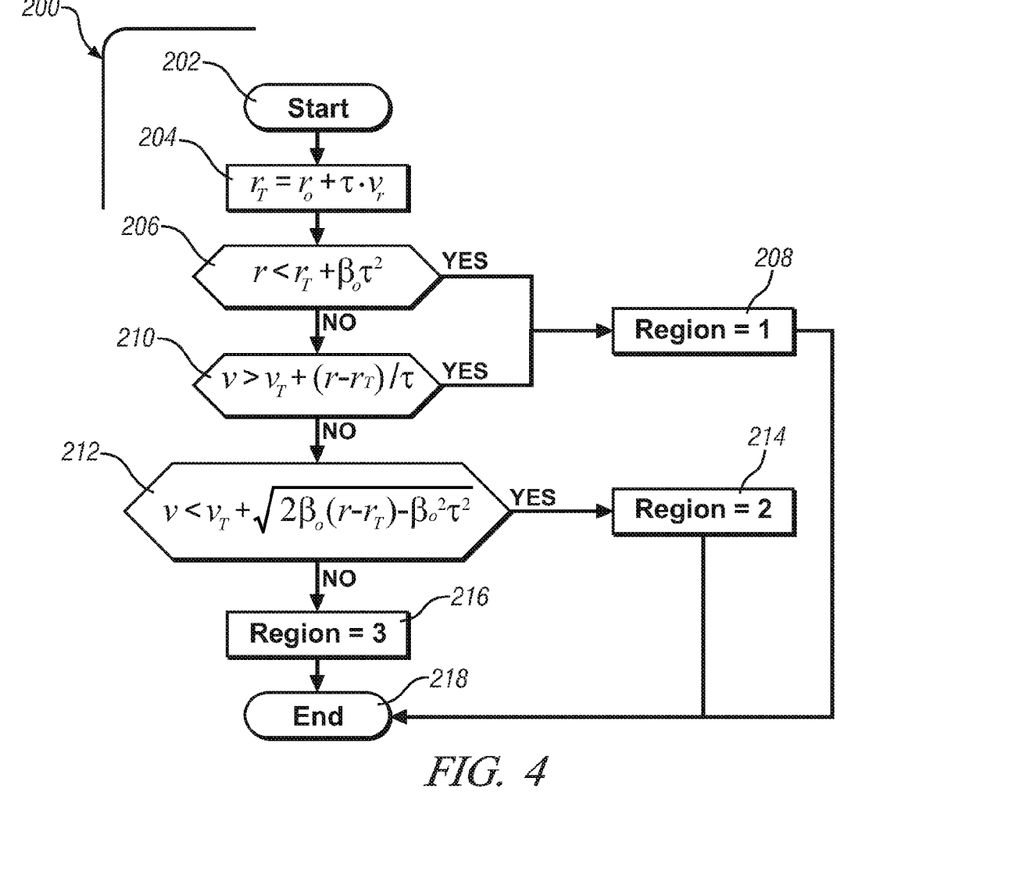
FIG. 4 depicts a exemplary process whereby the control region in which a vehicle is operating can be determined, in accordance with the present disclosure.

FIG. 4 depicts an exemplary process whereby the control region in which a host vehicle 110 is operating can be determined A region determination process 200 is initiated at block 202. At block 204, $r_T$ is determined and input to blocks 206, 210, and 212, as necessary. At block 206 measured range r of the host vehicle 110 is compared to the established border for Region 1 and if r establishes operation in Region 1, then a Region indicator is set to 1 at block 208 and the process proceeds to end at block 218. At block 210, measured speed v of the host vehicle 110 is compared to the established border for Region 1, and if it establishes operation in Region 1, then a Region indicator is set to 1 at block 208 and the process proceeds to end at block 218. At block 212, v is compared to the established borders for Region 2, and if v establishes operation in Region 2, then the Region indicator is set to 2 at block 214 and the process proceeds to end at block 218. At block 216, in the event that neither Region 1 nor Region 2 is established, then the Region indicator is set to 3 and the process ends at block 218, with the proper Region selected.

Once the control region is determined, a control algorithm speed profile is applied according to the selected region. If the host vehicle 110 state is in Region 1, 160, for example, and a sudden cut-in of a slower target vehicle 150 within short range r occurs, an immediate and large braking force is required to avoid collision. Since the host vehicle 110 is in Region 1, 160, the simple sliding surface 155 is selected for sliding mode control and expressed, for example, by the following equations.

$$v_1(r) = \frac{1}{\tau}(r - r_o) \qquad [21]$$

$$a_1(\dot{r}) = \frac{dv_d}{dr}\dot{r} = \frac{\dot{r}}{\tau} \qquad [22]$$

If the host vehicle 110 is in Region 2, 165, for example, and a slower target vehicle 150 cuts in with sufficiently long range r, there is no need for harsh braking, and the modified sliding surface 175 is selected for sliding mode control. Such a transition can be expressed, for example, by the following equations.

$$v_2(r, v_T) = v_T + \sqrt{2\beta_o \max\{(r - r_T), \beta_o \tau^2\} - \beta_o^2 \tau^2} \qquad [23]$$

$$a_2 = \frac{dv_2}{dt} \qquad [24]$$

If the host vehicle 110 is in Region 3, 170, for example, and a slower target vehicle 150 cuts in with sufficiently long range r, a constant deceleration control can be utilized. Such exemplary operation can be expressed, for example, by the following equations.

$$a_3 = -\beta, \qquad [25]$$

$$\beta = \frac{(r - r_T) - \sqrt{(r - r_T)^2 - \tau^2 \dot{r}^2}}{\tau^2} \qquad [26]$$

$$v_3 = v \qquad [27]$$

The reference acceleration $a_r$ and the reference speed $v_r$ are therefore selected according to the identified control region.

Figure 5:
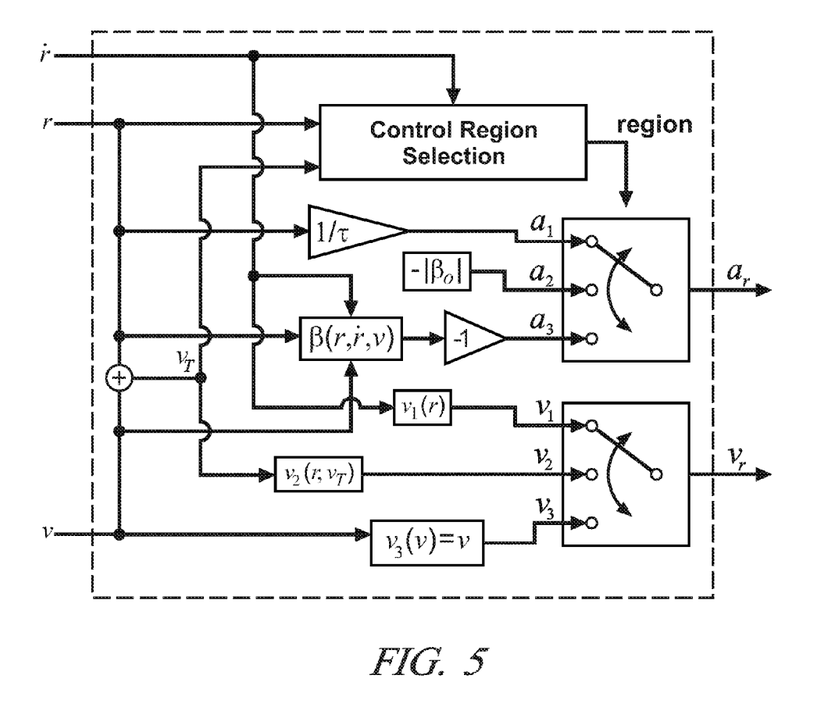
FIG. 5 depicts an exemplary information flow wherein a reference acceleration and a reference speed may be determined, in accordance with the present disclosure.

FIG. 5 depicts exemplary information flow wherein a reference acceleration $a_r$ and a reference speed $v_r$ may be determined. Inputs including r, r_dot, and v are monitored. These inputs, r, r_dot, and v, are conditioned and processed according to methods described herein to create an acceleration and speed for each of the Regions 160, 165, 170. Host vehicle 110 operation is classified according to the three Regions 160, 165, 170, as described above, and the proper $a_r$ and $v_r$ are selected based upon the classified region. The resulting $a_r$ and $v_r$ values are outputs to the flow.

Once the reference acceleration $a_r$ and speed $v_r$ are determined based on the control region, a control law can be applied. The control law can take the form of the following equations:

$$a_{cmd} = a_r + \gamma_p(v_r - v) + q \quad [28]$$

$$\dot{q} = \gamma_I(v - v_r) \quad [29]$$

Figure 6:
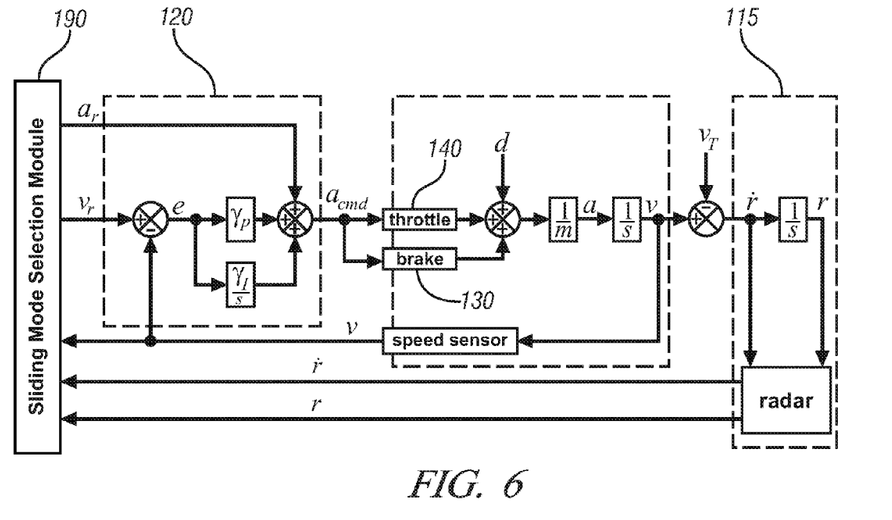
FIG. 6 schematically depicts operation of the above methods combined into a configuration performing the various methods, in accordance with the present disclosure.

FIG. 6 schematically illustrates operation of an exemplary target vehicle following control system 100, in accordance with the present disclosure. According to the methods described above, it will be appreciated that the illustrated system can monitor a range r and a range rate r_dot with respect to the target vehicle 150; monitor speed $v_T$ of the target vehicle 150; determine an acceleration command $a_{cmd}$ based upon the monitored range r, the monitored range rate r_dot, and the monitored speed v; and utilize the acceleration command $a_{cmd}$ to activate the braking control 130 and the powertrain output torque control module 140. A sliding mode selection module 190 determining the acceleration command $a_{cmd}$ includes classifying a current vehicle operation range, utilizing a current vehicle speed v and the range r, according to three regions 160, 165, 170 defined by a simple sliding surface 155 and a modified sliding surface 175. In certain embodiments, it will be appreciated that the modified sliding surface 175 is determined by limiting maximum deceleration. In some embodiments, it will be appreciated that the simple sliding surface 155 is determined by headway τ. In some embodiments, it will be appreciated that the vehicle speed v follows the selected profile by means of sliding mode control. In some embodiments, it will be appreciated that the resulting target object following control module 120 comprises proportional, integral and feed forward control.

The methods described above depict the various control modules of the method within the host vehicle 110 utilizing a sensing device 115, such as a radar subsystem, to establish inputs useful to ACC as described herein. However, it will be appreciated that a similar method could be utilized between two cooperating vehicles wherein vehicle-to-vehicle communication and data developed in both vehicles could be used to augment the methods described herein. For example, $v_T$ from a leading target vehicle can be dynamically updated based upon the sensors within the target vehicle. Additionally, an imminent lane change as indicated by position of the target vehicle within a lane as determined by sensors within the target vehicle or as indicated by activation of a turn signal in the target vehicle could be used to pre-warn the host vehicle and input a projected $v_T$ and r for immediate reaction by the host vehicle. Additionally or alternatively, navigational data from a GPS device can be utilized in conjunction with the methods described herein. For example, a target track observed by the host vehicle can be checked with local lane geometry available through navigational data and a digital map, and the trajectory of the target vehicle as indicating a cut-in or as a vehicle in the present lane of the host vehicle can be confirmed based upon the lane geometry data. A number of additional embodiments utilizing diverse sources of information within a vehicle are envisioned, and the disclosure is not intended to be limited to the particular exemplary embodiments described herein.

Other exemplary operations are described, wherein two vehicles equipped with the target object control module 120 traveling in the same lane could communicate such that each vehicle shares its operational data between the vehicles, e.g., present speed and acceleration. Further, if a range sensing device, such as described herein or a vehicle location device, e.g., global positioning sensor, radio wave triangulation, or similar, is available a range r and range rate r_dot may also be shared. Therefore, an application of a brake control 130 in a first vehicle 150 could be matched or quickly followed by application of a brake control 130 in a second, or following, vehicle 110, thereby lessening the severity of the controlled changes to v enabled herein. Additionally, other speed changes the first vehicle 130 experienced as a result of road variation or other control modules, e.g., a start of a hill, corner speed control, a vehicle speed limit tracking system, or a collision avoidance or preparation system, could be communicated and responded to in the second vehicle 110.

Similarly, if a first vehicle in one lane of travel experiences a turn signal or a turn of a steering wheel indicating a change in lane into the area in front of a second similarly equipped vehicle in communication with the first, the second vehicle could preemptively change speed to compensate based upon communicated predicted movement of the first vehicle.

Likewise, a chain of vehicles could link up and establish a coordinated group of vehicles, linked by the described system, wherein relative motion of the vehicle in front of the chain could be used to predictively control vehicles in the rear of the chain. In some embodiments, for example in commercial trucking applications, such chains could include a tightening of otherwise lengthy desired ranges r, particularly in the rear of such a chain, wherein communication from the front vehicles in the chain could be used to increase factors of safety associated with such ranges r in the vehicles in the rear, thereby achieving increased fuel efficiency associated with shorter distances between vehicles gained through aerodynamic effects. In combination with the methods described herein, commands to the group of vehicles could simulate or substitute group commands for $v_T$, signaling to vehicles in the rear of the group a group target velocity command that can initiate reactions according to the methods described herein such as in FIG. 3 based upon the group commands. Many such embodiments utilizing communication between vehicles are envisioned, and the disclosure is not intended to be limited to the particular embodiments described herein.

Simulation studies have been run to verify the methods as described above can be utilized to control a host vehicle 110 in steady state and dynamic lane conditions to reach the described outcomes.

Figure 7A:
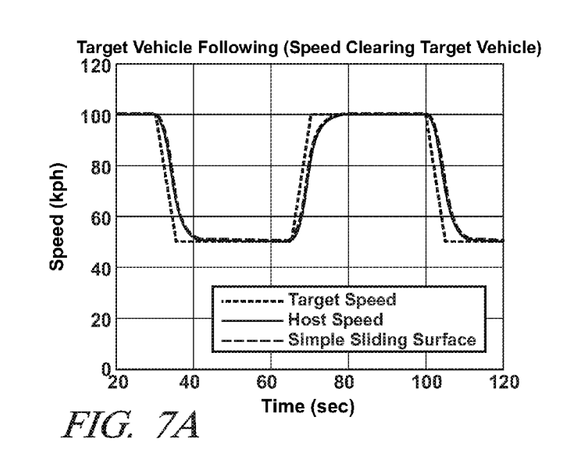
Figure 7B:
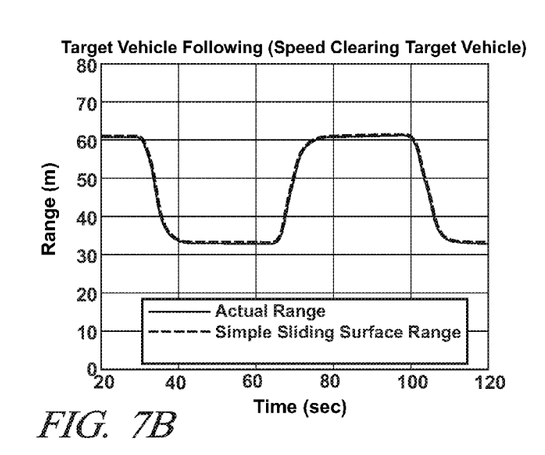
Figure 7C:
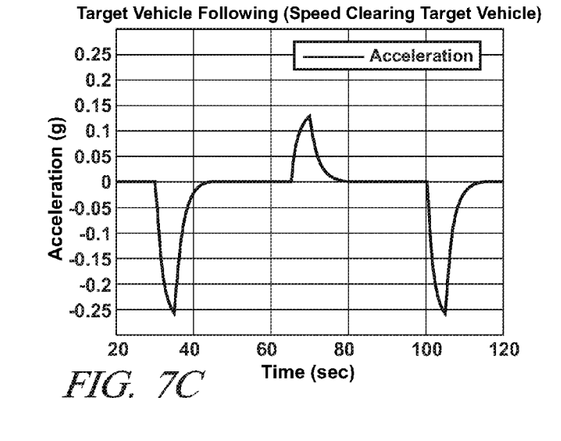
Figure 7D:
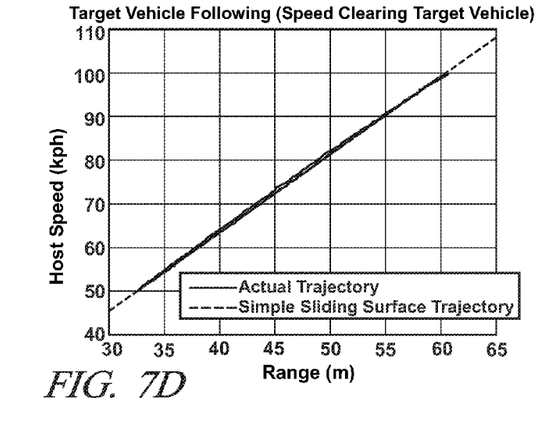

FIG. 7 is a series of graphs which depict an exemplary vehicle chase scenario with a host vehicle 110 following a target vehicle 150 wherein FIG. 7A graphically illustrates speed verses time, FIG. 7B graphically illustrates range versus time, FIG. 7C graphically illustrates acceleration verses time, and FIG. 7D graphically illustrates host speed verses time. The exemplary host vehicle 110 follows a target vehicle 150 in steady state lane operation using the aforementioned ACC control scheme. The scenario was simulated to chase a target vehicle 150 that changes speed between 100 kph and 50 kph. Initially, the host vehicle 110 follows the target vehicle 150 at 100 kph, the target vehicle 150 reduces its speed to 50 kph at approximately 0.3 g deceleration. The host vehicle 110 responds to the target vehicle 150 following the target vehicle's change in speed, r_dot, at a predetermined range r, according to the simple sliding surface 155. After the host and target vehicle 110, 150 reach steady state at 50 kph, the target vehicle 150 accelerates at approximately 0.3 g to 100 kph. The host vehicle 110 responds in kind, accelerating to follow the target vehicle 150 as the speed v increases and at a predetermined range r, according to the simple sliding surface 155.

As shown in FIG. 7D, the speed-range trajectory of the host vehicle 110 remains on the simple sliding surface 155 regardless of the target vehicle speed $v_T$. Therefore, FIGS. 7A and B depict near perfect tracking of target vehicle speed $v_T$ and range r. Further, the acceleration graph of FIG. 7C depicts a reasonable braking and throttling throughout the scenario.

Figure 8A:
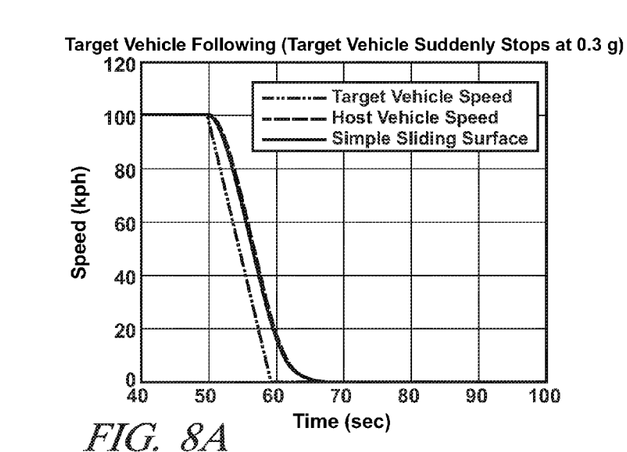
Figure 8B:
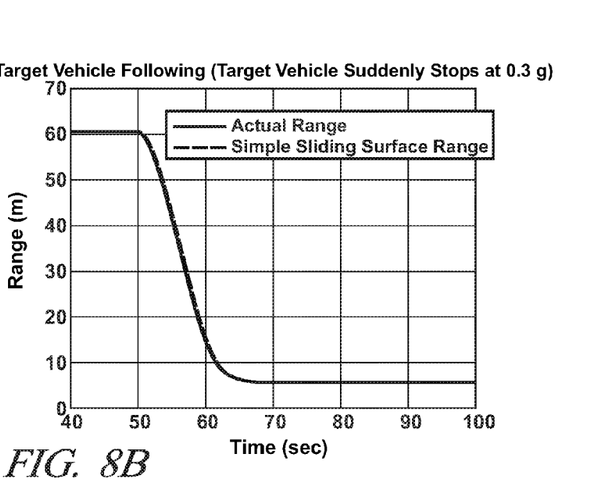
Figure 8C:
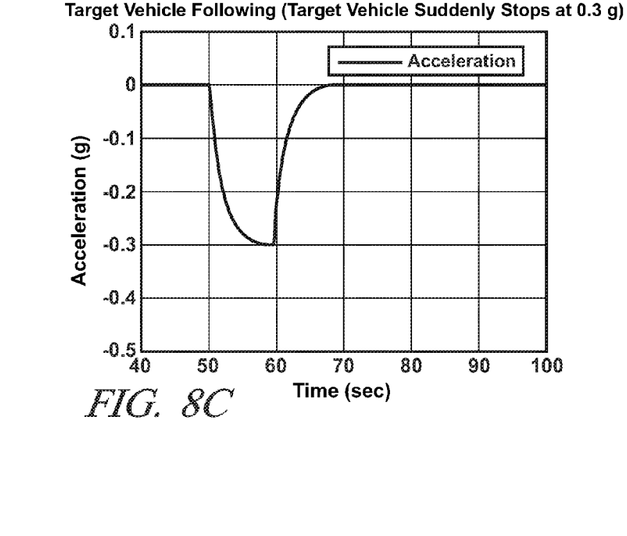
Figure 8D:
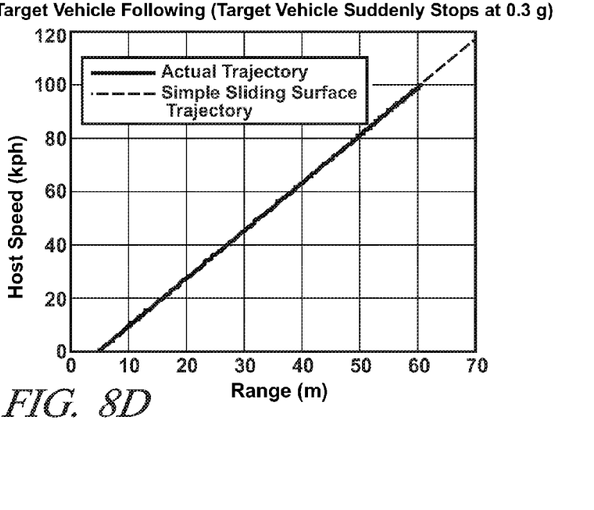

FIG. 8 is a series of graphs which depict a sudden stop exemplary scenario wherein FIG. 8A graphically illustrates speed verses time, FIG. 8B graphically illustrates range versus time, FIG. 8C graphically illustrates acceleration verses time, and FIG. 8D graphically illustrates host speed v verses range r for a target vehicle 150 chase scenario. The exemplary sudden stop scenario begins with a host vehicle 110 following a target vehicle 150 in steady state lane operation.

The sudden stop scenario was simulated to follow a target vehicle 150 that suddenly stops from 100 kph at approximately 0.3 g. Initially, the host vehicle 110 follows the target vehicle 150 at 100 kph, the target vehicle 150 then reduces its speed to 0 kph at approximately 0.3 g deceleration. The host vehicle 110 responds to the target vehicle 150 by decreasing its speed v and at a predetermined range r and according to the simple sliding surface 155. The vehicles 110, 150 slow to zero speed and the host vehicle 110 stops 5 m behind the target vehicle 150 where 5 m is the zero speed distance.

Figure 9:
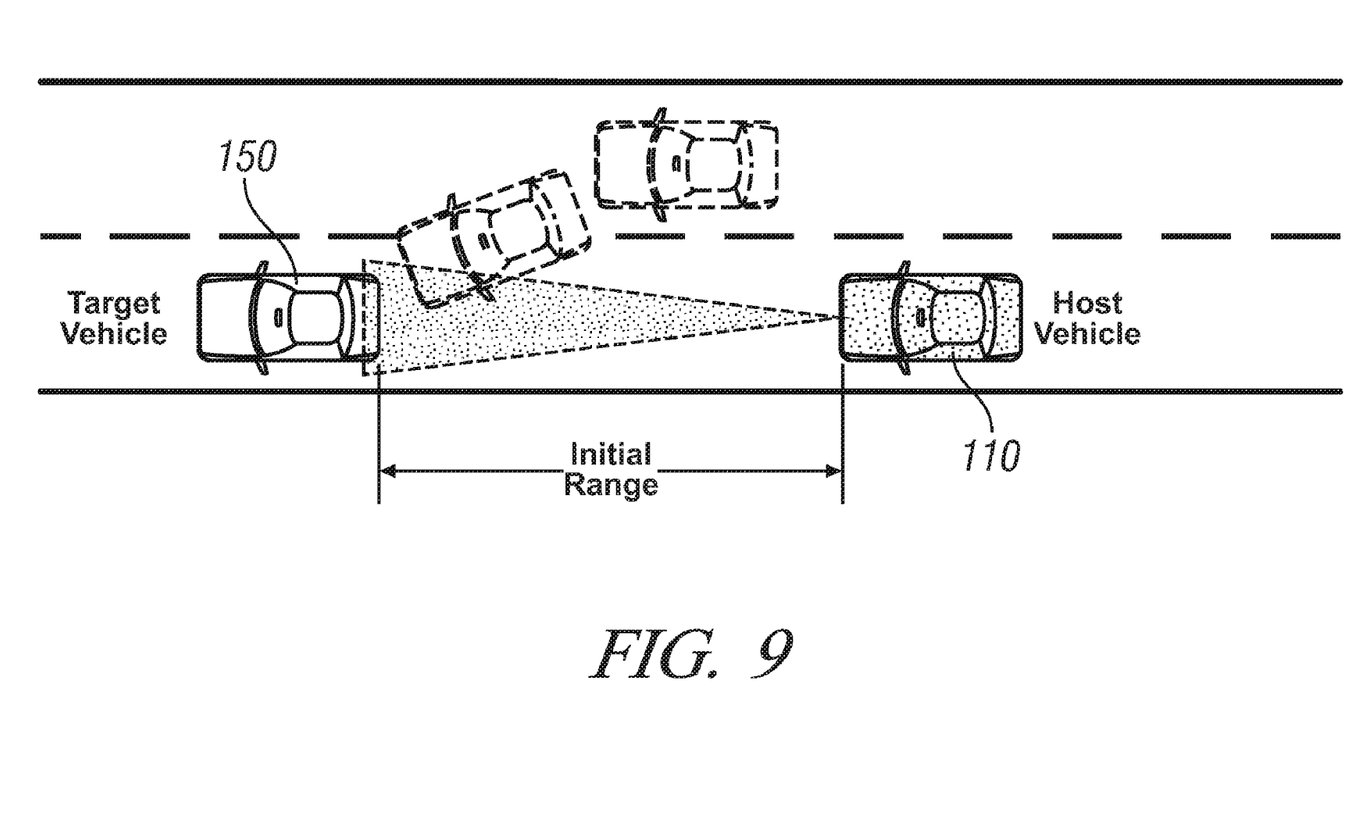
FIG. 9 is illustrative of a cut-in scenario wherein a host vehicle is traveling at a steady state speed in a travel lane wherein a slower target vehicle merges into the lane in front of the host vehicle.

FIG. 9 is illustrative of a cut-in scenario wherein a host vehicle 110 is traveling at a steady state speed in a travel lane wherein a slower target vehicle 150 merges into the lane in front of the host vehicle 110. The simulations include a mild cut-in, a moderate cut-in, and an aggressive cut-in, wherein the slower moving target vehicle 150 moves into the lane occupied by the hose vehicle 110 at predetermined distances in front of the host vehicle 110, as will be described below.

Figure 10A:
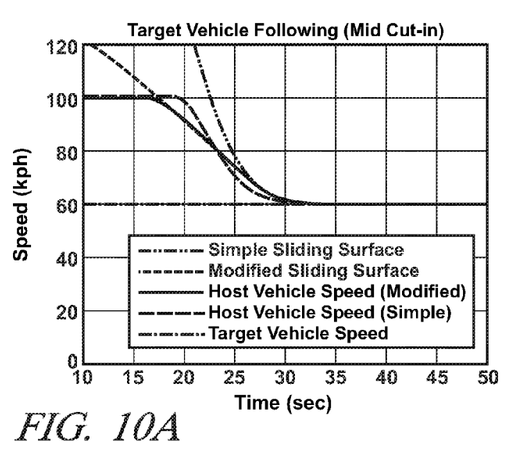
Figure 10B:
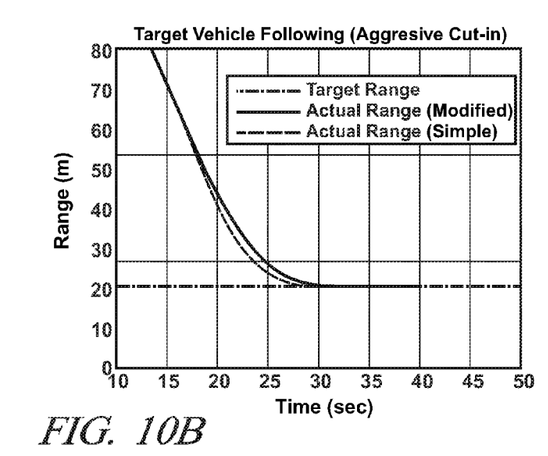
Figure 10C:
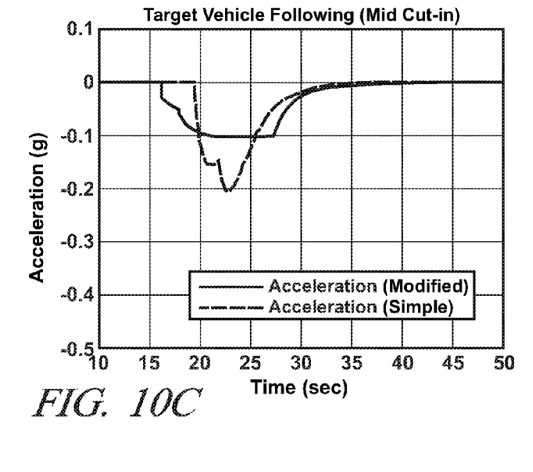
Figure 10D:
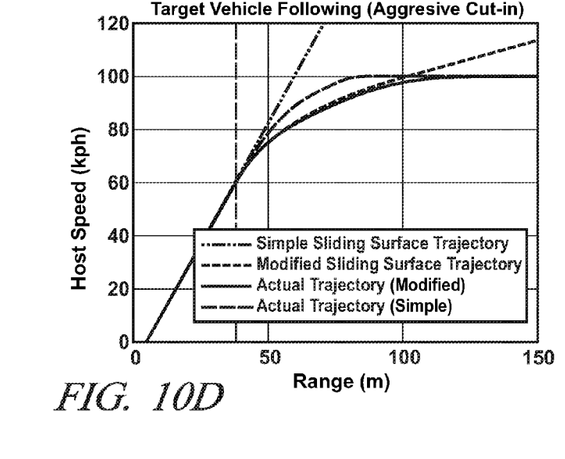

FIG. 10 is a series of graphs which depict a mild lane cut-in exemplary scenario wherein FIG. 10A graphically illustrates speed verses time, FIG. 10B graphically illustrates range versus time, FIG. 10C graphically illustrates acceleration verses time, and FIG. 10D graphically illustrates host speed verses range. The exemplary mild lane cut-in scenario transpires with the host vehicle 110 traveling at 100 kph and the target vehicle 150 traveling at 60 kph. The target vehicle 150 moves into the lane the host vehicle 110 is traveling in at a range of 120 m at about 16 sec on the time T based graphs respectively.

As depicted in FIG. 10A, the host vehicle 110 maintains a speed of 100 kph until the range r reduces to a point at which braking becomes necessary. If the host vehicle 110 where to follow the simple sliding surface 155, the host vehicle 110 brakes later and with a steep deceleration slope in accordance with the simple sliding surface 155. When the host vehicle 110 follows the modified sliding surface 175, the host vehicle 110 applies early braking and the speed of the target vehicle $v_T$ is met with a shallow deceleration slope in accordance with the modified sliding surface 175. Since braking occurs earlier and shallower, the host vehicle 110 will seem to operate smoother to the occupants. FIG. 10B depicts corresponding ranges r between the two control algorithms. Both control algorithms reach the appropriate final range r but the simple sliding surface 155 reaches it faster at a greater slope thereby indicating an increased transient response of the host vehicle 110 over the modified sliding surface 175. FIG. 10C depicts deceleration commands of the two control schemes. The simple sliding surface 155 brakes later and harder have two peak braking points and achieving a maximum deceleration of approximately −0.2 g while the modified sliding surface 175 brakes earlier and not as hard with a maximum deceleration rate of −0.1 g whereas each maintains the same area under the curve. FIG. 10D depicts speed-range trajectory and shows the actual trajectory of the host vehicle 110 does not change until it is close to the simple sliding surface 155. However, the trajectory of the host vehicle 110 on the modified sliding surface 175 changes its course earlier toward the equilibrium point (38.3 m at 60 kph) along the modified sliding surface 175.

Figure 11A:
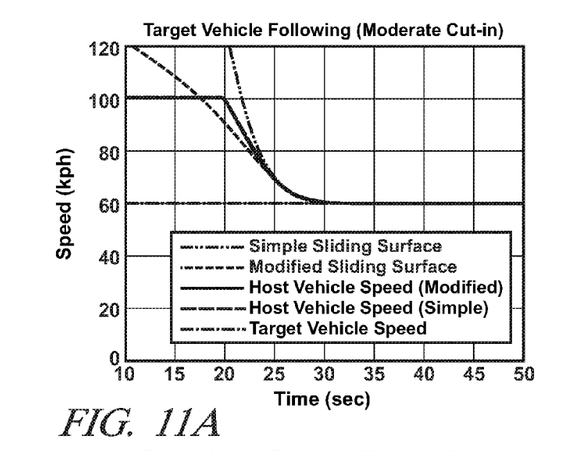
Figure 11B:
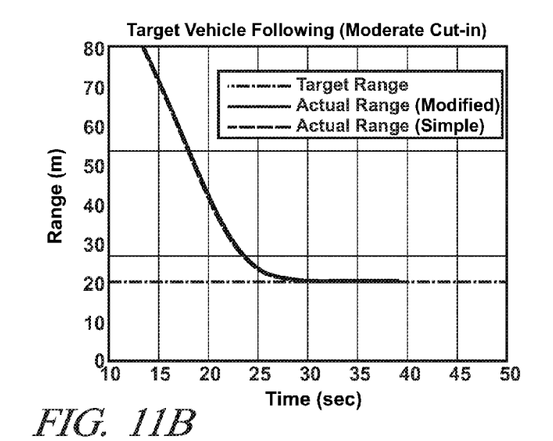
Figure 11C:
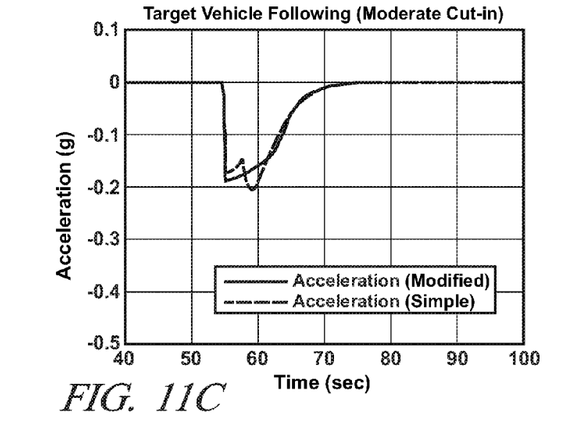
Figure 11D:
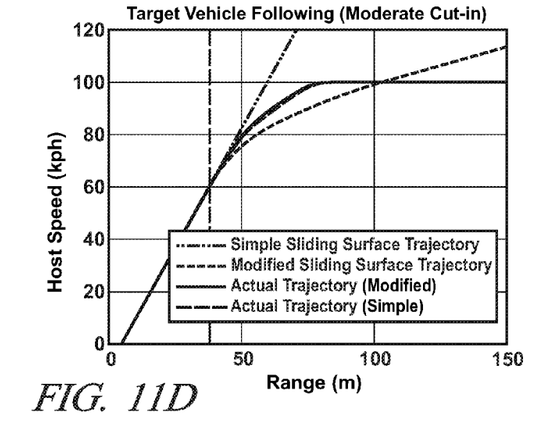

FIG. 11 is a series of graphs which depict a moderate lane cut-in exemplary scenario wherein FIG. 11A graphically illustrates speed verses time, FIG. 11B graphically illustrates range versus time, FIG. 11C graphically illustrates acceleration verses time, and FIG. 11D graphically illustrates host speed verses range. The exemplary moderate lane cut-in scenario transpires with the host vehicle 110 traveling at 100 kph and the target vehicle 150 traveling at 60 kph. The target vehicle 150 moves into the lane the host vehicle 110 is traveling in at a range of 80 m which is depicted at about 20 sec on the time T based graphs respectively.

As depicted in FIGS. 11A and 11B, in both the simple and modified sliding surface control schemes 155, 175 a similar transient behavior for the host vehicle 110 occurs. The host vehicle 110 immediately begins its speed reduction as the target vehicle 150 enters the lane. As depicted in FIG. 11C, since the speed difference r_dot between the two vehicles is large for the initial range r, the greatest deceleration rate occurs early and less braking is applied as the speed of the host vehicle 110 begins to match the target vehicle 150. When following the simple sliding surface 155, the host vehicle 110 has two peak braking points while following the modified sliding surface 175 has only one, thus the modified sliding surface 175 has a smoother transient response. FIG. 11D depicts the initial state of speed v and range r is beyond the slower acceleration rate $a_{cmd}$ of the modified sliding surface 175. The modified sliding surface algorithm first tries to bring the actual state trajectory to the modified sliding surface 175. Once the modified actual trajectory approaches the simple sliding surface 155, the modified actual trajectory approaches an equivalent state along the simple sliding surface 155.

Figure 12A:
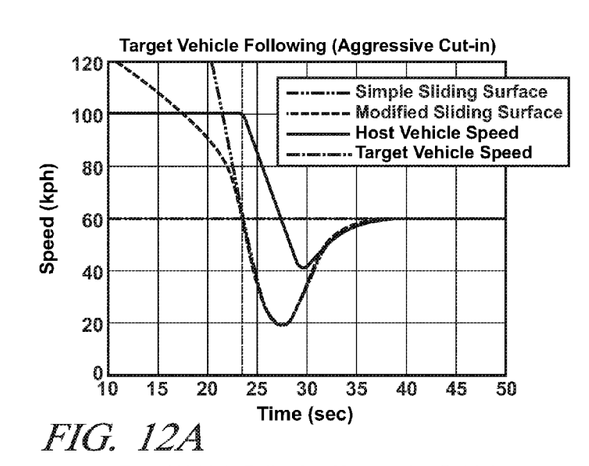
Figure 12B:
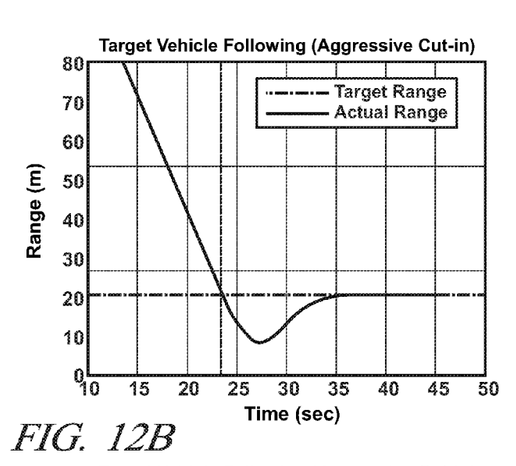
Figure 12C:
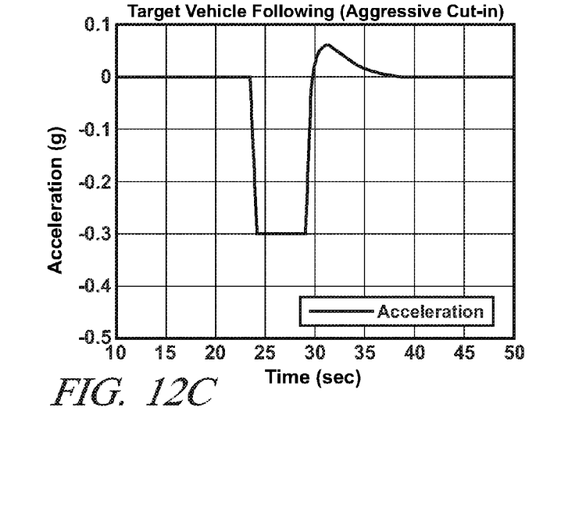
Figure 12D:
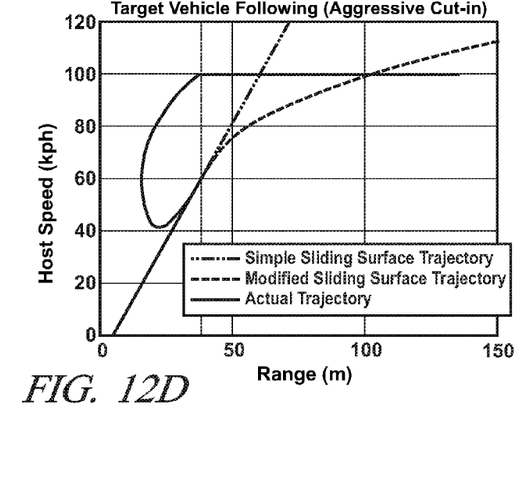

FIG. 12 is a series of graphs which depict an aggressive cut-in exemplary scenario wherein FIG. 12A graphically illustrates speed verses time, FIG. 12B graphically illustrates range versus time, FIG. 12C graphically illustrates acceleration verses time, and FIG. 12D graphically illustrates host speed verses range. The exemplary aggressive lane cut-in scenario transpires with the host vehicle 110 traveling at 100 kph and the target vehicle 150 traveling at 60 kph. The target vehicle 150 moves into the lane the host vehicle 110 is traveling in at a range of 40 m which is depicted as occurring at about 22 sec on the time T based graphs respectively.

In this situation, the host vehicle 110 responds similarly on both the simple sliding surface 155 and the modified sliding surface 175 for desired speed v. Therefore, the host vehicle 110 may use either the simple or modified sliding surface 155, 175. This scenario is best explained with relation to FIG. 12D, in terms of state trajectory. Once the target vehicle 150 cuts in, the initial range is beyond the simple sliding surface 155, which represents the minimum desired range, and the controller tries to bring the range close to the desired trajectory by reducing the host vehicle 110 speed. Even during the initial braking, the host vehicle 110 is still faster than the target vehicle 150, as the range r decreases down to approximately 20 m. Once the host vehicle speed v is less than the target speed $v_T$, the range r between the vehicles 110, 150 increases. When a safe range r is acquired, the host vehicle 110 accelerates to the target vehicle 150 speed v and a desired range r is followed according to the simple sliding surface 155 or the modified sliding surface 175 if the speed v increases enough. FIGS. 12A, 12B, and 12C depict the corresponding speed v, range r, and acceleration r_dot, respectively The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling vehicle speed in a host vehicle operating with a target vehicle following control system in relation to a target vehicle, the method comprising:
   monitoring a range between the host vehicle and the target vehicle;
   monitoring a speed of the host vehicle;
   determining a rate of change of the range between the host vehicle and the target vehicle;
   determining a speed of the target vehicle based upon the rate of change of the range between the host vehicle and the target vehicle and the speed of the host vehicle;
   determining a control region of the host vehicle by:
      comparing the range between the host vehicle and the target vehicle and the speed of the host vehicle to a simple sliding surface line defining a minimum range between the host vehicle and the target vehicle based upon a time headway; and
      comparing the range between the host vehicle and the target vehicle and the speed of the host vehicle to a modified sliding surface line defined by an increasing margin to the simple sliding surface line as the speed of the host vehicle increases;
   determining an acceleration command based upon the determined control region; and
   utilizing the acceleration command to control operation of the vehicle comprising one of,
      utilizing the acceleration command to change the speed of the vehicle until the speed of the vehicle is coincident with the simple sliding surface line and subsequently changing the speed of the vehicle upon the simple sliding surface line until the speed of the target vehicle is reached, and
      utilizing the acceleration command to change the speed of the vehicle until the speed of the vehicle is coincident with the modified sliding surface line and subsequently changing the speed of the vehicle upon the modified sliding surface line until the simple sliding surface line is reached and subsequently changing the speed of the vehicle upon the simple sliding surface line until the speed of the target vehicle is reached.

2. The method of claim 1, wherein the simple sliding surface line and the modified sliding surface line are coincident below a threshold speed of the host vehicle and diverge above the threshold speed of the host vehicle.

3. The method of claim 2, further comprising:
   determining a desired range value based upon the speed of the target vehicle and the simple sliding surface; and
   wherein the threshold speed is defined based upon the desired range value.

4. The method of claim 3, wherein the threshold speed is defined further based upon a set acceleration/deceleration limit of the host vehicle and a time headway based upon the range between the host vehicle and the target vehicle and the speed of the host vehicle.

5. The method of claim 2, further comprising defining a threshold range based upon the threshold speed and the simple sliding surface line and wherein determining the control region of the host vehicle comprises defining operation of the host vehicle within a region selected from the group consisting of:
   the range between the host vehicle and the target vehicle being less than the threshold range;
   the comparing the range between the host vehicle and the target vehicle and the speed of the host vehicle to the simple sliding surface line indicating that the speed of the host vehicle is greater than a desired velocity for the range between the host vehicle and the target vehicle based upon the simple sliding surface line;
   the comparing the range between the host vehicle and the target vehicle and the speed of the host vehicle to the simple sliding surface line indicating that the range between the host vehicle and the target vehicle is greater than the threshold range and that the speed of the host vehicle is less than a desired velocity for the range between the host vehicle and the target vehicle based upon the modified sliding surface line; and
   operation of the vehicle being between the simple sliding surface line and the modified sliding surface line.

6. The method of claim 5, wherein, utilizing the acceleration command to change the speed of the vehicle until the speed of the vehicle is coincident with the simple sliding surface line and subsequently changing the speed of the vehicle upon the simple sliding surface line until the speed of the target vehicle is reached when the operation of the host vehicle within the region consists of the range between the host vehicle and the target vehicle being less than the threshold range.

7. The method of claim 5, wherein, utilizing the acceleration command to change the speed of the vehicle until the speed of the vehicle is coincident with the simple sliding surface line and subsequently changing the speed of the vehicle upon the simple sliding surface line until the speed of the target vehicle is reached when the operation of the host vehicle within the region consists of the comparing the range between the host vehicle and the target vehicle and the speed of the host vehicle to the simple sliding surface line indicating that the speed of the host vehicle is greater than the desired velocity for the range between the host vehicle and the target vehicle based upon the simple sliding surface line.

8. The method of claim 5, wherein, utilizing the acceleration command to change the speed of the vehicle until the speed of the vehicle is coincident with the modified sliding surface line and subsequently changing the speed of the vehicle upon the modified sliding surface line until the simple sliding surface line is reached and subsequently changing the speed of the vehicle upon the simple sliding surface line until the speed of the target vehicle is reached when the operation of the host vehicle within the region consists of the comparing the range between the host vehicle and the target vehicle and the speed of the host vehicle to the simple sliding surface line indicating that the range between the host vehicle and the target vehicle is greater than the threshold range and that the speed of the host vehicle is less than a desired velocity for the range between the host vehicle and the target vehicle based upon the modified sliding surface line.

9. The method of claim 2, wherein the threshold speed of the host vehicle comprises an operator selectable threshold speed.

10. The method of claim 2, wherein the threshold speed of the host vehicle is modified based on factors affecting operation of the vehicle.

11. The method of claim 1, wherein the modified sliding surface line is determined based upon a set acceleration/deceleration limit of the host vehicle.

12. The method of claim 1, wherein the simple sliding surface line is determined by a time headway based upon the range between the host vehicle and the target vehicle and the speed of the host vehicle.

13. The method of claim 1, wherein monitoring the range between the host vehicle and the target vehicle comprises analyzing data from a radar device.

14. The method of claim 1, wherein monitoring the range between the host vehicle and the target vehicle comprises analyzing data communicated between the host vehicle and the target vehicle.

15. Method for controlling vehicle speed in a host vehicle operating with adaptive cruise control in relation to a target vehicle, the method comprising:
   monitoring a range between the host vehicle and the target vehicle;
   monitoring a speed of the host vehicle;
   determining a rate of change of the range between the host vehicle and the target vehicle;
   determining a speed of the target vehicle based upon the rate of change of the range between the host vehicle and the target vehicle and the speed of the host vehicle;
   defining a simple sliding surface line determined by a desired range between the host vehicle and the target vehicle based upon a time headway;
   defining a modified sliding surface line adjacent to the simple sliding surface line, defined by an increasing difference between the simple sliding surface line and the modified sliding surface line indicating an increased range buffer between the host vehicle and the target vehicle as the speed of the host vehicle increases;
   determining a control region of the host vehicle by comparing the range between the host vehicle and the target vehicle and the speed of the host vehicle to the simple sliding surface line and modified sliding surface line;
   determining an acceleration command based upon the determined control region; and
   utilizing the acceleration command to control operation of the vehicle comprising one of,
      utilizing the acceleration command to change the speed of the vehicle until the speed of the vehicle is coincident with the simple sliding surface line and subsequently changing the speed of the vehicle upon the simple sliding surface line until the speed of the target vehicle is reached, and
      utilizing the acceleration command to change the speed of the vehicle until the speed of the vehicle is coincident with the modified sliding surface line and subsequently changing the speed of the vehicle upon the modified sliding surface line until the simple sliding surface line is reached and subsequently changing the speed of the vehicle upon the simple sliding surface line until the speed of the target vehicle is reached.

16. Apparatus for controlling vehicle speed in a host vehicle based upon a tracked target vehicle in front of the host vehicle, the apparatus comprising:
   a sensor monitoring a speed of the host vehicle;
   a sensing device monitoring a range between the host vehicle and the target vehicle monitoring a rate of change of the range between the host vehicle and the target vehicle;
   a target object following control module:
      monitoring the sensor;
      monitoring the sensing device;
      determining a speed of the target vehicle based upon the rate of change of the range between the host vehicle and the target vehicle and the speed of the host vehicle;
      determining a control region of the host vehicle by comparing the range between the host vehicle and the target vehicle and the speed of the host vehicle to a simple sliding surface line and a modified sliding surface line; and
      generating an acceleration command based upon the determined control region comprising one of,
         generating the acceleration command to change the speed of the vehicle until the speed of the vehicle is coincident with the simple sliding surface line and subsequently changing the speed of the vehicle upon the simple sliding surface line until the speed of the target vehicle is reached, and
         generating the acceleration command to change the speed of the vehicle until the speed of the vehicle is coincident with the modified sliding surface line and subsequently changing the speed of the vehicle upon the modified sliding surface line until the simple sliding surface line is reached and subsequently changing the speed of the vehicle upon the simple sliding surface line until the speed of the target vehicle is reached;
   wherein the simple sliding surface line is determined by a desired range between the host vehicle and the target vehicle based upon a time headway;
   wherein the modified sliding surface line is adjacent to the simple sliding surface line and is defined by an increasing headway as the speed of the host vehicle increases;
   wherein the modified sliding surface line and the simple sliding surface line are coincident at a threshold speed; and
   wherein three control regions are defined by a region between the sliding surfaces lines, regions to either side of the sliding surfaces lines, and a region wherein the range between the host vehicle and the target vehicle are less than a threshold range based upon the threshold speed.

17. The apparatus of claim 16, wherein the sensing device monitoring a range between the host vehicle and the target vehicle comprises a radar device.

18. The apparatus of claim 16, wherein the sensing device monitoring a range between the host vehicle and the target vehicle comprises a LIDAR device.

19. The apparatus of claim 18, further comprising:
   a brake control module receiving the acceleration command; and
   a powertrain output torque control module receiving the acceleration command.

* * * * *